Jan. 12, 1960  J. CZERNIEWICZ  2,920,662

MORTISING ATTACHMENT FOR PORTABLE DRILL

Filed Oct. 31, 1957

INVENTOR.
JOHN CZERNIEWICZ
BY

United States Patent Office 2,920,662
Patented Jan. 12, 1960

2,920,662

MORTISING ATTACHMENT FOR PORTABLE DRILL

John Czerniewicz, Mineola, N.Y.

Application October 31, 1957, Serial No. 693,656

4 Claims. (Cl. 144—70)

This invention relates to woodworking apparatus and more particularly to means for making slots, grooves, or mortise joints with a portable electric drill.

More particularly the invention relates to an attachment for a portable electric drill permitting use of the drill for making accurate, close-fitting dadoes, grooves, mortises and the like in wood.

The problem of making mortise points or cutting slots in wood, for instance in making furniture or bookcases or for mounting locks on doors, generally requires large and expensive machinery which is not available to the average amateur or home workman. The only alternative he has is to do the job with a hand chisel which is a tedious and inaccurate procedure and results in loose joints. However, most amateur workworkers have a portable electric drill, and the present invention provides an attachment for this basic tool which permits the conventional portable electric drill to be used for cutting neat, accurate and workmanlike slots and mortise joints.

The present invention generally comprises a guide or rack having a center slot and having a plurality of guide teeth along the sides of the slot. A cutting tool holder is adapted to be rotatably mounted between the teeth so as to drill a plurality of holes. The tool holder may also be rotated to cut away the scalloped edges between the individual holes left by the drill and to provide a smooth slot.

Accordingly, a principal object of the invention is to provide new and improved woodworking means.

Another object of the invention is to provide new and improved means to adapt an electrical drill for cutting a slot or mortise joint.

Another object of the invention is to provide new and improved means for cutting a slot with a rotating cutting tool.

Another object of the invention is to provide new and improved means for cutting slots with a portable drill comprising a rack having a large slot and a plurality of guide teeth along the sides of said slot and cutting tool holder adapted to be rotatably mounted between said guide teeth.

Another object of the invention is to provide new and improved means for accurately positioning and firmly securing a device for cutting a slot with a rotating and oscillating cutting tool.

These and other objects of the invention will become apparent from the following specification and drawings, of which:

Figures 1, 1A:
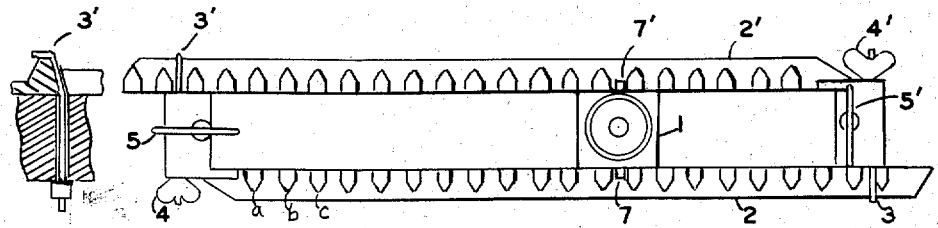
Figure 1 is a plan view of an embodiment of the invention.
Figure 1A is a detail view.
Figure 2:
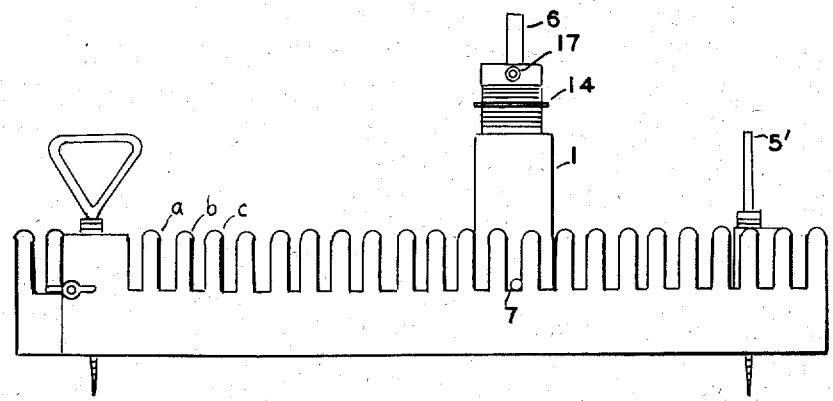
Figure 2 is a side view of the embodiment of Figure 1.

Referring to the drawings, the invention generally comprises a guide or rack having two identical side pieces 2 and 2' which are adapted to be clamped together by the threaded hooks 3 and 3' which fit between the teeth of the rack and the wing nuts 4 and 4'. The side pieces may be clamped together through different spaces so as to adjustably vary the length of the large slot between the side pieces, as shown in Figure 1A.

The guide is adapted to be fastened to the work piece by means of the thumb screws 5 and 5'. These screws are so located that they serve to position and center the device, by being made to pierce a center line 24 or 24' which passes through the middle of the desired slot or mortise. The holes 21, 21' made by the thumb screws are generally covered by the shoulders of the tenon or mating piece or lock plate or may be filled. However, if it is desired to avoid any holes, the guide may be clamped into place or otherwise connected. However, these thumb screws have the advantage that they may be used at any point on a large piece of wood whereas clamps can only be used near the edges.

Figure 3:
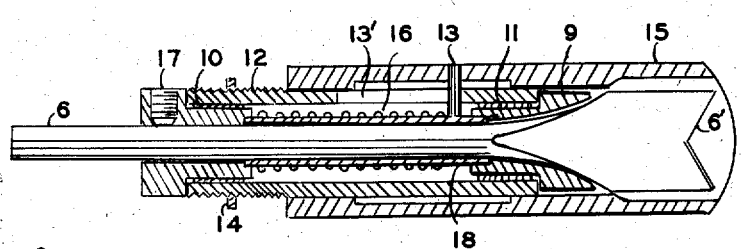
Figure 3 is an enlarged sectional view of the cutting tool holder.
Figure 4:
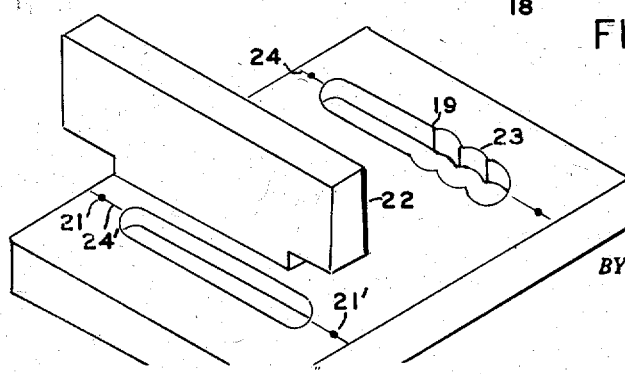
Figure 4 is a diagram illustrating the use of the invention.

Each side piece has a plurality of teeth a, b, c, and so forth. The cutting tool holder 1 is generally square so that it will not rotate within the guide. Referring to Figure 3 the cutting tool holder comprises a body member 12 having two sets of bearings 10 and 11 which rotatably support journals 8 and 9 holding the shaft of the cutting tool 6 which may be held in place by means of the set screw 17. A spring loaded guard 15 is slidably mounted on the body member 12 and is spring loaded by the spring 16 which bears against the pin 13 which is fixed to the guard 15. The pin 13 rides in a slot 13' in the body member 12. The mounting pins 7 and 7' are mounted on the guard 15 and are not shown in Figure 3.

When the cutting tool holder is mounted in the rack 2, 2' and pushed down, the cutting edges 6' of the cutting tool will be exposed since the guard 15 will ride up along the body member 12 until the top of the guard 15 rests against the adjustable stop nut 14, which is mounted on a threaded portion of the body member 12. Therefore, by adjusting the stop nut 14, the depth of the cut may be accurately controlled.

In operation, first the rack or guide is fastened to the work piece so that line 24, marking the middle of the proposed groove or mortise, is exactly in the middle of the working slot of the guide, and thumb screws 5 and 5' pierce line 24. The cutting tool holder 1 is then mounted in the rack with the portable electric drill, not shown, already connected to the shaft of the cutting tool 6. A series of holes 23 are then drilled generally outlining the desired slot by placing the tool holder 1 between different teeth of the rack. The depth may be accurately controlled by means of the depth adjustment 14. As the series of overlapping holes 23 are cut, there will be a scalloped edging left in the slot from the individual holes. This edging may be removed and the sides smoothed off as at 19 by rotating the tool holder about the axis of the pins 7 and 7', through a short arc immediately after each succeeding hole is bored. A finished slot is shown at 20 ready to receive the mating piece 22 which may be easily notched with a hand saw.

Cutting tools of various width and size may be used and will be held by the journal members 8 and 9. The journal member 9 has an internal shape to conform to the outline of the cutting tools and, therefore, causes a cutting tool of any width to center itself. The journal members 8 and 9 are held together by the retaining tube 18 which holds the assembly together when the cutting tool is removed.

The cutting tool is preferably of the type shown in Figure 3 which is a flat plate drill having two cutting edges 6' which taper in towards the center. If this type of tool is not readily available, it may be easily ground down from a conventional flat drill of the type having a center point. This type cutting tool is suitable for use with portable electric drills which are generally fairly low speed from 1300 to 2200 r.p.m. This cutting tool will drill a clean hole rapidly at electric drill speed, and only a small amount of material remains to be cleaned up by the side cutting action.

As previously mentioned, the cutting tool is made safe by means of the spring loaded guard 15 which encloses the cutting edges when the tool is not mounted in the rack.

Adjustments for width, length and depth of cut are simple, quick and positive. The width is determined by the size of the cutting tool, the length by the relative setting of the size of the rack, and the depth is accurately and continuously variable by means of the depth gauge nut 14.

Therefore, the present invention provides a simple and inexpensive attachment for portable electric drills for making slots and mortise joints in a neat and accurate manner. Various modifications may be made without departing from the scope of the invention which is defined by the following claims.

I claim:

1. Means for cutting a slot in wood with a portable drill comprising a frame having a large slot along its length and a plurality of large uniformly spaced guide teeth along both sides of said slot on one surface of said frame, a cutting tool holder for said drill having a pair of coaxial pins one on each side thereof, said holder being adapted to fit in said slot, said pins being adapted to fit between said teeth to mount said tool holder for rotation in the plane of the axis of said slot.

2. Means for cutting a slot in wood with a portable drill comprising a flat normally horizontal narrow frame having a lengthwise slot extending vertically through said frame and a plurality of guide teeth uniformly spaced along both sides of said slot on the upper surface of said frame, and a cutting tool holder adapted to be mounted between said teeth at different points along said frame, said tool holder having a sliding guard to shield a cutting tool in said holder when said holder is withdrawn from said rack.

3. Apparatus as in claim 2 wherein said members have adjustable connecting means to adjust the length of said slot.

4. Apparatus as in claim 2 wherein said cutting tool holder has depth adjustment means.

References Cited in the file of this patent

UNITED STATES PATENTS

| | | |
|---|---|---|
| 345,637 | Johnson | July 13, 1886 |
| 1,621,061 | Carter | Mar. 15, 1927 |
| 1,698,068 | Ranney | Jan. 8, 1929 |
| 1,718,324 | Wappat | June 25, 1929 |
| 1,762,457 | Uhrin | June 10, 1930 |
| 2,663,335 | Gohm | Dec. 22, 1953 |

FOREIGN PATENTS

| | | |
|---|---|---|
| 46,026 | Germany | Feb. 1, 1899 |
| 475,964 | Germany | May 7, 1929 |
| 78,528 | Sweden | Oct. 3, 1933 |